H. L. YOUNG AND M. S. FINCH.
AUTOMATIC MIXING AND ANTISCALDING VALVE.
APPLICATION FILED FEB. 25, 1916.
1,308,829.
Patented July 8, 1919.
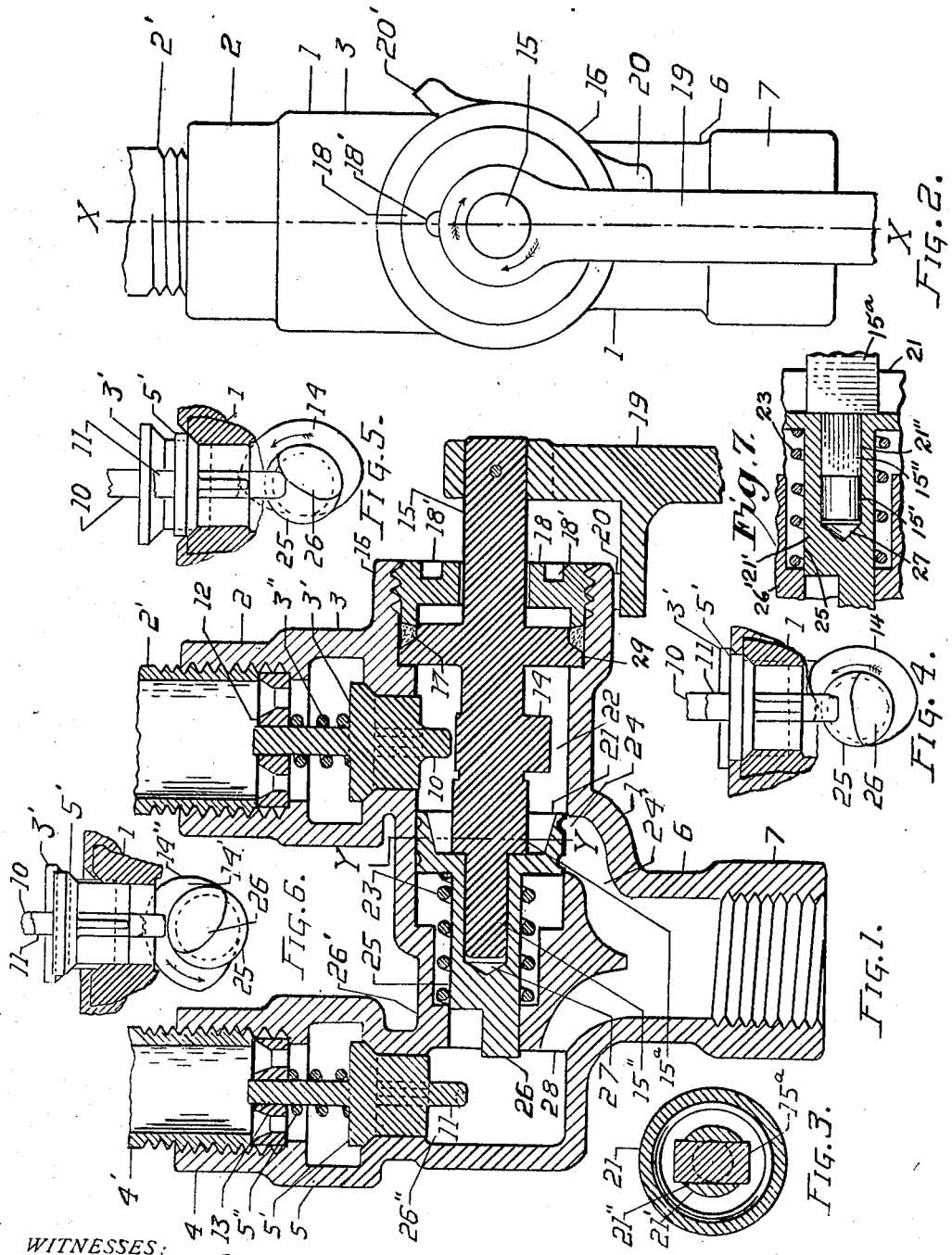

UNITED STATES PATENT OFFICE.

HARRY L. YOUNG AND MAURICE S. FINCH, OF ST. JOSEPH, MISSOURI.

AUTOMATIC MIXING AND ANTISCALDING VALVE.

1,308,829.  Specification of Letters Patent.  Patented July 8, 1919.

Application filed February 25, 1916. Serial No. 80,371.

*To all whom it may concern:*

Be it known that we, HARRY L. YOUNG and MAURICE S. FINCH, citizens of the United States, residing at St. Joseph, in the county of Buchanan and State of Missouri, have invented certain new and useful Improvements in Automatic Mixing and Antiscalding Valves, of which the following is a specification, reference being had therein to the accompanying drawing.

Our invention relates to improvements in that class of mixing valves, which are used for mixing cold water and steam or for mixing cold and hot water, in providing water, heated to various temperatures, for scrubbing floors, bathing, and all other purposes, where heated water is used. The objects of our improvements are, first; to provide a valve of this class, by the use of which, cold water and the heating agent can be mixed in any desired proportions, second: to provide automatic shut-off mechanism for the heating agent, whereby the latter is kept shut off, until cold water is flowing, under pressure, through the valve, and whereby said heating agent is automatically shut off, in an instant, whenever said cold water thus ceases to flow, thereby preventing the burning of hose, leading from the valve, and the scalding of persons, on whom the water is flowing, third: to so form and arrange the liquid conducting passages, that there shall be no backflow of liquid therethrough, nor direct impact of the heating agent against the cold water, and vice versa, regardless of the initial pressures of the same, thereby preventing the concussion and jar in the valve, which is commonly called water hammer, fourth: to so construct the valve, that the cold water and the heating agent are prevented from reaching each other, until they reach the mixing chamber.

I attain these objects by the mechanism illustrated in the accompanying drawing, in which:—

Figure 1 is a longitudinal section, embodying the invention cut on the line X, X, seen in Fig. 2, looking toward the right. Fig. 2 is a plan view of the valve. Fig. 3 is a transverse section of the valve piston, on the line Y Y, seen in Fig. 1, looking toward the left. Figs. 4 and 5 are detail views of the valves and their cams, looking toward the right, showing the same in two positions. Fig. 6 is a similar view in detail showing one of the other various forms in which the cold water controlling cam may be made. Fig. 7 is a side view of the sleeve coupling certain parts being broken away.

Referring to Fig. 1, valve body 1 has water inlet connection 2, valve chamber 3, steam inlet connection 4, steam valve chamber 5, mixing chamber 6, and outlet connection 7, formed therewith, through the latter of which, the hereinafter described mixture of water and steam is discharged.

Valves 3' and 5' are actuated by springs 3" and 5", respectively, to close their respective valve openings. Said valves have stems 10 and 11 respectively, formed therewith.

Said stems are respectively guided in the apertured stem guides 12 and 13.

Water valve 3' is raised by rotation of cam 14, which is formed with the inner end portion 15$^a$, of drive shaft 15, which latter has collar 29 formed therewith. Said collar is rotatably mounted in the inner end of packing box 16, which is formed with body 1.

Said collar is held against longitudinal movement, between the inner flanged end of said packing box and packing 17, which latter is pressed against said collar by packing compressor 18, having spanner wrench cavities 18' formed in its outer face.

Handle 19 is secured on the outer end of drive shaft 15 and has its rotative movement limited by stops 20 and 20', which are formed on the outer surface of packing box 16, as seen in Fig. 2.

Valve piston 21, (see Fig. 1,) is slidably and rotatably mounted in piston chamber 22, and is actuated by spring 23, to close the upper end of water passage 24. Said piston has sleeve 21' formed therewith, which latter has stem 25 formed on the end thereof. Cam 26 is formed on the end of said stem, and is thereby carried into and from active position, with relation to valve stem 11. Said stem is slidably and rotatably mounted in an aperture formed through partition 26' which is formed with body 1, between chamber 22 and steam cam chamber 26", which latter is formed in body 1.

Sleeve 21' has an annular countersink 27 formed therein, in which the annular end portion 15' of shaft 15 is slidably guided. The adjacent portion 15" of said shaft is of rectangular form, (see Figs. 3 and 7,) which latter portion is slidable in slot 21″, which slot is formed in said sleeve. The shouldered portion 15ᵃ of shaft 15 limits the previously described, spring actuated movement of piston 21.

Said slotted sleeve and the rectangular portion of said shaft which is engaged therewith, form a slidable drive coupling, whereby said shaft rotates said sleeve and the therewith connected parts.

Chamber 26″ and mixing chamber 6 are connected by steam passage 28, the transverse area of which gradually increases in size, from chamber 26″ to its outlet end, for purposes hereinafter described.

The central portion 24′ of water passage 24 is formed of reduced transverse area for the same reasons.

Water inlet connection 2 is connected with a source of water under pressure, by pipe 2′, while steam inlet connection 4 is connected with a source of steam under pressure, by pipe 4′.

Since said sources of steam and water may be of any well known kind, they and their connection are neither shown nor described.

Outlet connection 7 is adapted to have a hose nipple connected therewith, for attaching hose thereto, or to have a pipe connected therewith, for conducting the heated water from the described valve, to any desired point.

In operation, with the parts in the position seen in Figs. 1, 2 and 4, the operator of the valve, manually rotates handle 19, clockwise, thereby rotating cams 14 and 26 from the positions seen in Fig. 4, to the positions seen in Fig. 5.

During this movement, cam 14 moves stem 10 and the therewith formed valve 3′, opening said valve and admitting water (not shown,) from chamber 3 into chamber 22.

The water thus admitted, moves piston 21 from the position seen in Fig. 1, overcoming spring 23, and opening passage 24. Said water then passes through reduced portion 24′ of said passage, under full pressure, and moves more slowly through the larger, lower end portion of said passage, and thence into mixing chamber 6. The thus maintained full water pressure in portion 24′ of passage 24, forms resistance against back-flow of steam therein, as hereinafter described, and also maintains a sufficient amount of pressure of water in chamber 22, to hold piston 21 in its described position.

This movement of said piston and the therewith formed piston stem 25 and cam 26, carries said cam into active position, with relation to valve stem 11. It will be seen and understood from the foregoing, that cam 26 is held from its active position, by pressure of spring 23 against piston 21 until said spring is overcome, as stated, and also that should supply of water fail from any cause, the resulting lack of hydraulic pressure against piston 21, would liberate said spring, the pressure of which would move said piston from its described position, to the position seen in Fig. 1, thereby moving cam 26 from its described active position to the position shown.

This arrangement of devices at all times, renders said cam inactive and prevents the opening and the holding open thereby, of the steam inlet valve 5′, (as hereinafter described,) except while water is in chamber 22 under pressure, and is passing therethrough; which prevents burning of hose and scalding of persons, as stated in the objects.

Continued rotation of handle 19, until stopped by stop 20′, rotates cams 14 and 26, the latter of which continues to hold stem 10 and the therewith formed valve 3′ in their described raised position, while cam 26 raises stem 11 and the therewith formed valve 5′, which admits steam from chamber 5, into chamber 26″, from whence said steam passes into steam passage 28, under full pressure. Said steam gradually expands to a lower pressure in passing through the gradually increased bore of said passage, until the larger end of said passage is reached, where said steam unites with the previously mentioned water, in mixing chamber 6.

It will be understood that said steam upon thus uniting with said water, is thereby condensed and heats said water, and that the unshown water discharging conductors which are connected with outlet connection 7, are of such ample capacity, that they do not materially cause back pressure in said mixing chamber.

It will also be understood that the said full pressures of water and steam in the smallest portions of the bores of passages 24 and 28 are such, that the reduced pressures of the same, found in the largest portions of said passages, can not overcome said full pressures, in either passage, thus preventing backflow of either in the passage of the other. The steady flow of steam and water, at reduced pressures, in streams, inclined toward each other, as directed by their respective passages, causes said streams to unite, without causing what is commonly called water-hammer, which is frequently experienced in the use of valves of this class.

Reverse rotation of handle 19, from stop 20′ to stop 20, liberates valves 5′ and 3′, in the order named, upon which their respective springs 5″ and 3″, (assisted by the pressures of said steam and water,) close said valves.

While we have shown and described the water controlling cam 14, in the foregoing manner, it is evident that said cam could be made in various forms, for controlling the inlet of water in various ways, which we reserve the right to do.

One of such other forms of water controlling cams is shown in Fig. 6, in which cam 14' has the sloped face 14" formed thereon, for allowing stem 10 and the therewith formed water controlling valve 3' to be gradually closed, for gradually stopping the flow of water therepast, which results in a hotter mixture in mixing chamber 6, seen in Fig. 6. This form of cam is desirable where the heating agent is hot water instead of steam, and especially where said heating agent has not been heated to a sufficiently high degree. It also provides means for adjusting the heat of the water, by adjustably rotating handle 19, seen in Fig. 1. Since all of the unmentioned parts seen in Fig. 6, are the same in construction and operation as the previously described parts, said unmentioned parts are designated as previously pointed out, and further description of the same is deemed unnecessary.

Having fully described our invention, what we claim as new, and desire to secure by Letters Patent, is:—

In a mixing and anti-scalding valve; a valve body; a mixing chamber formed with said body; an outlet directly connected with said mixing chamber; a piston chamber in said valve body; a water passage connecting said piston chamber with said mixing chamber; a piston valve slidably and rotatably mounted in said piston chamber a spring for moving said piston valve to normally close said passage, said valve being adapted to be slidably moved by pressure of water thereagainst and overcome said spring for opening said passage; a cam shaft rotatably mounted in said piston chamber; a slidable drive coupling whereby the inner end of said shaft and said piston valve are coupled together; the outer end portion of said cam shaft being extended outside of said valve body; a water inlet valve for admitting water into said piston chamber, said valve being provided with a stem therefor; a steam cam chamber connected with said mixing chamber; a steam inlet valve for admitting a heating agent into said steam cam chamber said valve having a stem therefor; a steam cam in said chamber said cam being formed with said piston valve and being thereby normally held out of active position with relation to the last mentioned valve stem; a handle on the extended end of said cam shaft whereby the same is rotated; and a cam on said shaft beneath the stem of said water inlet valve, said cam being so timed in relation to said steam cam that said water inlet valve is fully opened before said steam cam becomes operative.

In testimony whereof we affix our signatures in the presence of two witnesses.

HARRY L. YOUNG.
MAURICE S. FINCH.

Witnesses:
 ISAAC H. HOWARD,
 LENA P. BOXELL.

Copies of this patent may be obtained for five cents each, by addressing the "Commissioner of Patents, Washington, D. C."